UNITED STATES PATENT OFFICE.

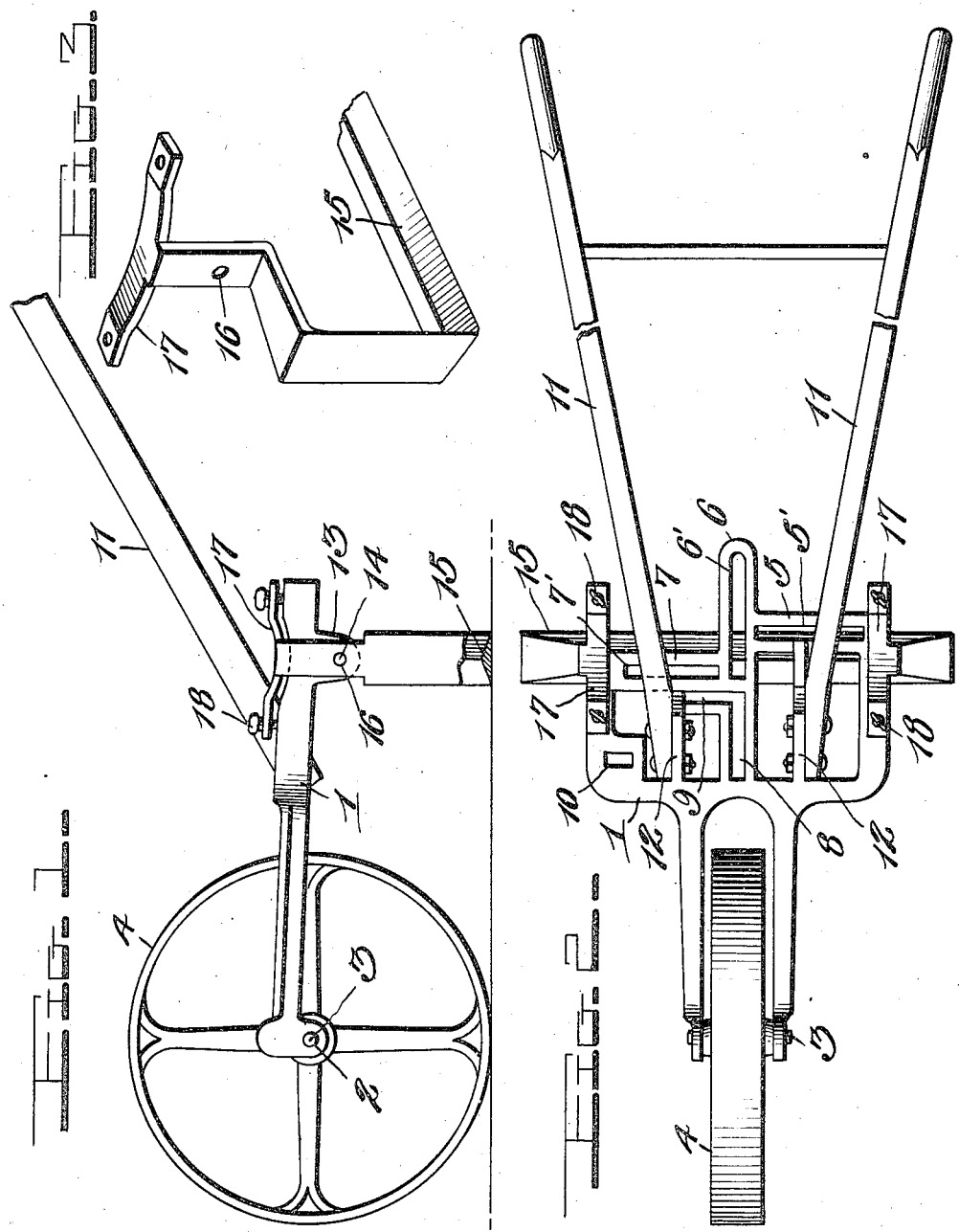

AUGUST GLATT, OF EUREKA, CALIFORNIA.

CULTIVATOR.

1,017,048.                Specification of Letters Patent.    Patented Feb. 13, 1912.

Application filed August 4, 1911. Serial No. 642,245.

*To all whom it may concern:*

Be it known that I, AUGUST GLATT, a citizen of the United States, residing at Eureka, in the county of Humboldt and State of California, have invented certain new and useful Improvements in Cultivators, of which the following is a specification, reference being had to the accompanying drawings.

This invention relates to agricultural apparatus, and more particularly to that class of devices that are known as cultivators.

The object of this invention is to provide a cultivator that can be used when the same is moved in either backward or forward direction.

Another object of this invention is to arrange it for holding various agricultural implements, such as plow points, shovels, and the like in this device so that they can be used therewith.

A further object of this invention is to have the arrangement of parts such that they can be readily inspected and repaired whenever the same is desirable.

Other objects of this invention will become apparent as it is more fully set forth.

In the construction shown in the drawings, which embody one form of this invention, Figure 1 represents a view in elevation of a cultivator embodying this invention. Fig. 2 is a plan view of Fig. 1. Fig. 3 is a detail of a knife used in this cultivator.

Similar reference characters refer to similar parts throughout the drawings.

In the construction shown in the appended drawings, 1 represents a main framework that has its front portion provided with holes 2 arranged to receive an axle 3 of a guiding wheel 4.

Provided on the back portion of the framework are a number of cross pieces 5, 6, and 7 disposed as is clearly shown in Fig. 2. These pieces are provided with slots as indicated at 5', 6', 7', 8, 9 and 10, for the insertion of various agricultural implements, such as plow points, shovels, and the like. The slots are so arranged as to provide a certain amount of adjustment for these implements, or for the receiving of several of the implements at the same time within them, so that a various number of arrangements can be had with these devices, both in their number and in their relative positions.

11 are handles suitably secured to braces 12 mounted on the sides of the framework in a suitable manner as is clearly shown in the drawings.

Provided on the lower portion of the framework 1 is a projection 13 which is provided with a bolt 14 thereon in order to pivotally receive a knife bolt 15, that is provided with holes 16 in the upper portion thereof arranged to fit over said bolts. The knife 15 is provided with a double edge as is clearly shown in the drawings, in order to permit a cultivator to dig into the ground in a suitable manner, whether pushed forward or backward. The upper portion of the knife, which extends above the framework, is provided with a curved piece of material 17 that is arranged to engage with the upper portion of the frame, when the knife of the cultivator engages in the ground and is slightly tipped thereby, which causes the pieces 17 to also tip and have one of their end portions engage with the upper portion of the frame 1. The amount of tip that is permitted to the knife by the pieces 17 is such that it will cause the knife to desirably dig into the ground, and this amount of tip can be varied by means of set screws 18 provided in these end portions of the pieces 17 for the purpose.

The knife may be of any length to suit the conditions under which it is to be used, and of any desirable width, but in ordinary cases would be about 10 inches, but the same is so attached to the framework that it can be readily detached therefrom by pulling the upper end portions apart so that they will come off of the bolts 14, after which another knife of suitable length and width can be inserted thereon should it be desired. In cases where it is not desired to use the knife in this cultivator, but to use other agricultural implements, the operator simply places the same within the various slots 5, 6, etc. as are most desirable for the operation to be performed; the number and arrangement of these points being so arranged in the framework as to suitably meet the conditions arising.

In operation, a knife of suitable length and width is placed upon the bolts 14 mounted on the projections 13 of the framework 1 and the upper pieces 17 disposed thereon have their side screws 18 suitably adjusted to give the desired tilt to the cultivator knife for the work to be done. Should it be desired to use other implements instead of the knife, the latter is removed by pulling its upper portions apart in the manner already described and the various other agricultural implements fastened in the slots provided in the main framework therefor.

In general this device is so simple as to provide no possibility of any parts getting out of order or otherwise interfering with the operation of this device, and the parts are so arranged that they can be readily gotten at when desirable, and such inspection and repairs made as appear necessary.

Obviously while there is shown but one form of this invention in the drawing, it is not desired to limit this invention in any way otherwise than necessitated by the prior art, as many modifications in the construction of this invention may be made without departing from the principles thereof.

Having thus described this invention, it is claimed:

In combination with a cultivator, a knife, holding members secured to the end portions of said knife and extending upwardly therefrom and arranged for pivoted connection to said cultivator, a plurality of arms disposed on the upper portion of said members and arranged to come in contact with the frame of said cultivator, said arms being provided with a plurality of threaded holes therein, a plurality of screws disposed in said holes and arranged to come in contact with said frame so as to regulate the angular tip fore and aft of said knife.

In testimony whereof I hereunto affix my signature in the presence of two witnesses.

AUGUST GLATT.

Witnesses:
 GEO. A. KELLOGG,
 L. T. CARR.